Figure 1:
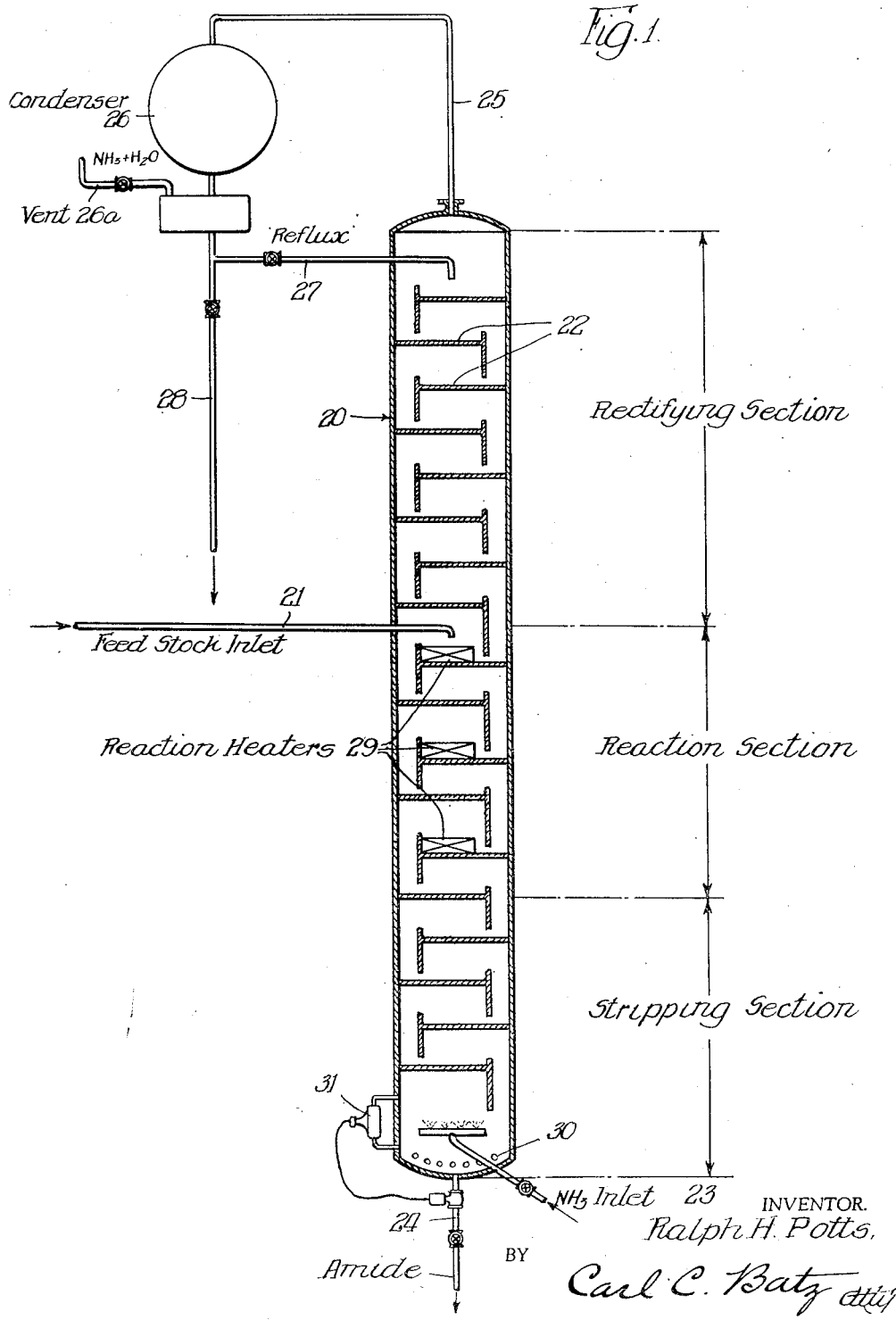

March 27, 1951 R. H. POTTS 2,546,521
MANUFACTURE OF NITRILES AND AMIDES
Original Filed March 20, 1941 2 Sheets-Sheet 1

INVENTOR.
Ralph H. Potts,
BY Carl C. Batz ATTY.

March 27, 1951     R. H. POTTS     2,546,521
MANUFACTURE OF NITRILES AND AMIDES
Original Filed March 20, 1941     2 Sheets-Sheet 2

Fig. 3
Fig. 2

INVENTOR.
Ralph H. Potts,
BY
Carl C. Batz

Patented Mar. 27, 1951

2,546,521

UNITED STATES PATENT OFFICE 2,546,521

MANUFACTURE OF NITRILES AND AMIDES

Ralph H. Potts, La Grange, Ill., assignor to Armour and Company, Chicago, Ill., a corporation of Illinois Original application March 20, 1941, Serial No. 384,232. Divided and this application September 1, 1945, Serial No. 614,022

7 Claims. (Cl. 260—404)

This invention relates to the preparation of fatty acid nitriles and deals especially with continuous processes for preparing such nitriles. The invention also relates to processes for the production of fatty acid nitriles in which the corresponding amides are simultaneously obtained.

The nitriles of the higher fatty acids, namely these fatty acids having eight or more carbon atoms, are substances of increasing technical importance. They are useful in the arts as such, and they can be readily hydrogenated to corresponding primary aliphatic amines. The amides of the higher fatty acids also are of great commercial importance and efficient methods for producing them have long been desired.

An important object of the present invention is to provide simple and effective processes for conducting the reaction of fatty acids and ammonia to produce the corresponding nitriles. Another object is to provide such processes which may be easily and economically operated with a minimum of equipment to produce the desired products at a rapid rate. Another object is to provide processes which can be continuously operated and which will yield a high quality product in which the conversion to nitriles is substantially complete. Another important object is to provide a continuous process in which nitriles and amides are separately obtained.

Another object is to provide a process for producing nitriles wherein the use of a catalyst and the equipment normally associated with the use of a catalyst is not necessary.

Still another object is to provide improved and simplified apparatus for carrying out the processes here involved.

Figure 1 of the accompanying drawing is a schematic diagram of one type of apparatus which may be used in carrying out the improved processes. It is understood, however, that widely differing types of equipment may be used in practicing the invention.

In the apparatus illustrated in Figure 1, the fatty acid feed enters a tower arrangement 20 by way of line 21. This tower is equipped with receptacles consisting of bubble trays and plates indicated by the numeral 22. Any suitable number of trays may be used and the tower may be of any suitable size and height. The tower can be looked upon as containing three general zones. That zone disposed at about the middle of the tower is the reaction zone wherein the primary reaction between ammonia and the fatty acid takes place. The upper section of the tower can be considered as the rectifying zone wherein nitriles are continuously separated from fatty acids, and the lower or stripping zone is the section where fatty acids are separated from amides. Ammonia enters the tower through line 23, amide can be withdrawn through line 24, and vapors leave the tower through line 25 to a condenser 26 wherein the nitrile product is condensed. Arrangement is made for the return of reflux, if desired, through line 27 connecting with nitrile outlet 28. As here shown the moisture and excess ammonia pass off through vent 26a to the atmosphere. If desired, provision can be made for recovering the excess ammonia for re-use in the process.

The middle section or reaction zone of the tower is heated with one or more heating coils schematically shown at 29. These heating coils are desirably heated with a fluid which is introduced in the vapor state but has a condensation temperature above the reaction temperature to be maintained in the reaction zone. Such a fluid may suitably be a mixture of diphenyl and diphenyl oxide. Other ways of heating the reaction zone can be used, for example, the heating coils 29 can contain steam as a heating fluid, or electrical heating elements can be employed.

The following detailed description of the operation of this arrangement illustrated will deal with the reaction of stearic acid for purposes of explanation, it being understood that other suitable stock may be used in place of this.

The liquid stearic acid after being passed through line 21 into the tower meets an upward current of ammonia, and here enters into reaction with ammonia. It is believed that the reaction involves first the formation of ammonium soaps ($RCOOH+NH_3 \rightarrow RCOONH_4$); the soaps then breaking down to form stearamide and water ($RCOONH_4 \rightarrow RCONH_2+H_2O$); and the amide then breaking down to form nitrile and ammonia and fatty acid

$$(2RCONH_2 \rightarrow RCOOH+RCN+NH_3)$$

The nitriles boil at lower temperatures than the corresponding fatty acids and the fatty acids boil at lower temperatures than the corresponding amides. Consequently, nitrile vapor, together with some quantities of stearic acid vapor pass upwardly from the reaction zone into the rectifying zone.

In the rectifying zone are a series of zones containing pools of liquid. As shown in Figure 1, reflux liquid in the form of condensed nitriles is introduced at the upper portion of the rectification zone. As the vapors from the reaction zone, including nitriles and some fatty acids, pass upwardly through the pools of liquid counter to the reflux nitriles, the fatty acids, being of higher boiling point than the nitriles, are selectively condensed, and the vapors reaching the top of the rectifying zone are substantially pure nitriles. The pools within this zone will be found to contain a successively larger proportion of nitriles and a smaller proportion of fatty acids toward the upper portion of the zone. Any amides which may have been vaporized in the reaction zone will, of course, be quickly condensed and returned by the rectifying action. The nitriles proceeding toward the top of the zone may themselves be condensed and revaporized as they pass upwardly, and finally pass off in vaporous form. The vaporous nitriles, after being condensed by the condensing equipment 21, are recovered in part as a liquid nitrile product and part is returned through line 27 to the upper portion of the tower as reflux liquid.

As before stated, the reactions taking place at the reaction zone of the tower include the formation of amides, and not all of the amides immediately break down into nitriles, the ratio of amides, nitriles and fatty acids existing in the reaction zone depending in part on the temperature and the time in contact with the heat supply. The amides, being of higher boiling point than either the corresponding nitriles or fatty acids, will tend to move downwardly in the pools within the tower. The amides, however, are intermixed with unreacted fatty acids, nitriles and any other high boiling substances of the feed stock; and as this mixture, principally amides and fatty acids, moves into the pools within the stripping section against the upwardly moving current of ammonia, the fatty acids and any nitriles present are stripped from the amides. Also, any fatty acids and nitriles formed by further breakdown of the amides are carried upwardly in the same way. Thus the pools within the stripping section contain a successively larger proportion of amides and a smaller proportion of fatty acids toward the bottom of the section.

The amides collect in substantially pure form at the bottom of the tower and may be withdrawn either continuously or at intervals through the outlet 24. An automatic level regulating device 31 of any suitable type may be used to maintain a desired level of liquid amide at the bottom of the tower. A heat coil 30 is provided at the bottom of the tower for supplying heat to the stripping zone in addition to that furnished from the reaction zone where such additional heat is necessary to maintain the desired temperature. The temperature in the stripping zone need only be high enough to vaporize fatty acids in the presence of the introduced ammonia. The ammonia entering the bottom of the tower causes fatty acid to be vaporized at a lower temperature than would ordinarily happen if no ammonia were present. In the stripping zone of the tower the temperature, for stearic acid nitrile formation, is maintained at an average of about 300° C. which is high enough to cause the stearic acid to boil without vaporizing the stearamide. Under the conditions of the process, having regard for the introduction of ammonia and its tendency to lower the boiling points of the fatty acid materials in the tower, the stearic acid will boil at 297° C. whereas stearamide boils at 321° C.

Temperatures maintained within the tower are, of course, dependent upon the kind of fatty acid introduced. With stearic acid the reaction heaters 29 may be maintained at a temperature of about 300° C. This is below the boiling point of stearic acid at ordinary room pressure in the absence of any added ammonia. In view of the ammonia present, however, some of the stearic acid will vaporize before it has reacted with ammonia to form ammonium soaps as a first product. The upper section of the tower may be maintained at about 275° C. which is low enough to cause the stearic acid vapors in the rectifying zone to condense but is high enough to maintain the nitrile in the vapor state. Thus, there is a continuous rectification of the mixture of nitrile vapors and stearic acid vapors entering the rectifying zone and the stearic acid is pushed down from the rectifying zone into the reaction zone.

As above indicated, there will also be a temporary accumulation of stearic acid amide in the reaction zone. This amide, together with unreacted fatty acid flows downward into the stripping zone maintained at a temperature of about 300° C., for example. As before stated, under these conditions fatty acid accumulated in the stripping zone is pushed upward into the reaction zone leaving the stearamide behind. Thus, this process permits the continuous production of both nitriles and amides.

However, when nitrile only is the desired product then the outlet at the bottom of the tower can be closed. Amide collection in the stripping zone decomposes continuously to form nitrile and fatty acid in accordance with the equations before given, and both of these substances pass into the reaction zone, with the nitrile finally passing from the rectifying zone and out of the tower. In this case the tower acts as a nitrile production unit without the recovery of an amide product. The amide collects at the bottom of the tower where it is built up to such extent that its conversion into nitriles by decomposition is automatically accomplished.

It will be observed that when nitriles only are produced, the stripping zone serves no useful purpose; consequently where amides are not desired this section may be omitted.

The rectifying, reaction and stripping sections may of course take forms widely differing from that shown in Figure 1, and, if desired, these sections may be disposed in different enclosures or towers instead of in a single tower as shown.

A modified type of reaction section is illustrated schematically by Figure 2 of the drawing in which is contained the trays 35 which provide a series of intermediate zones comprising liquid pools. Liquid is withdrawn from the lower portion of the section through line 36 by the pump 37 and passed through the heater 38 and returned to the upper portion of the section through line 39. The heater may employ as a heating medium a mixture of diphenyl and diphenyl oxide which condenses at the temperature desired to be maintained. Of course other suitable heating means may be employed. In the operation of this modified arrangement the liquid within the reaction zone is passed downwardly in considerable volume due to the circulation here provided, and this enables very efficient contact between the liquid and the upwardly moving ammonia.

With other fatty acids the process may be the same, although the tower temperature conditions will vary to meet the requirements of any particular acid. These requirements are simply that the reaction zone be operated at a temperature such that nitriles are distilled from the reaction mixture, the stripping zone be operated at a temperature such that fatty acids are vaporized, in the presence of the added ammonia, and the rectifying zone be operated at such a temperature that fatty acid vapors are substantially condensed therein while at the same time delivering the nitriles in vaporous form.

The reaction taking place within the reaction zone is substantially in the liquid phase, although because of the presence of the ammonia, which is best used in amounts of about five times that stoicheometrically required by theory, there will be some vaporization of fatty acid. The vaporized fatty acid, however, is condensed in the rectifying section and so returned in liquid phase for reaction with ammonia in the reaction zone.

The feed stock may be any higher fatty acid such as stearic, palmitic, oleic, linoleic, lauric, etc. Lower fatty acids may also be used but with such acids it is in some cases necessary to regulate the pressures within the tower to produce the desired liquid or vapor phases involved in the process as already described.

Also mixtures of fatty acids may be used. However, it is preferable that the fatty acid-bearing constituents of the feed stock have a rather narrow range of boiling points so that the nitrile of one constituent will not be held with the fatty acid or amide of another constituent to an objectionable degree as the process goes forward.

I have found that a particularly suitable feed material is produced by hydrolyzing some naturally occurring oil, such as soya bean oil or cotton-seed oil, and then fractionating the acids so obtained according to the processes set forth in the Potts et al. Patent No. 2,224,984 to produce a fraction containing a high proportion of acids which boil within a narrow range.

While in the foregoing description and illustration the rectifying, reaction, and stripping sections employed have been, for clearness of understanding, set out as distinct and permanent sections, it must be understood that there may be considerable overlapping of the parts of the equipment which serve as such sections. For example, using one type of stock and one set of temperature conditions, the respective reactions, stripping, and rectifying functions may be taking place at certain positions within the tower, while with some other stock and using other conditions these functions and reactions may take place at other points. Thus, when I refer to a reaction section, for example, I mean to indicate the portion wherein the reaction takes place under the conditions of operation employed, and not necessarily a precise part of a tower.

Figure 3 of the drawings shows schematically a modified type of apparatus wherein the rectifying section employed in Figure 1 has been replaced by a catalyst chamber. As here shown, the tower 40 is provided with trays 41, similar to those in the apparatus previously described. Leading from the reaction section of the tower is a conduit 42 which connects with the catalyst chamber 44.

The catalyst chamber 44 here shown is formed of a plurality of tubes 45, the ends of which communicate with the heads 46 and 47. Held within these tubes is a suitable dehydrating catalyst such as alumina. For heating this catalyst chamber a suitable heating fluid such as a mixture of diphenyl and diphenyl oxide is introduced in a vaporous form into the space about the tubes through the inlet 48, and then withdrawn in liquid form through outlet 49. Other types of catalyst chambers may, of course, be used.

In the operation of this modified system, the fatty acid stock is introduced through pipe 50 into the tower 40 where it passes downwardly through the series of zones against an upwardly moving current of ammonia just as in the system shown in Figure 1. Here a substantial reaction takes place between the acids and ammonia which yields a mixture including nitriles, amides, water and unreacted fatty acids. As heat is absorbed the water and nitriles are rapidly vaporized and passed out through the conduit 42, and since no substantial rectification takes place a certain amount of fatty acids and amides may also be carried along with the nitriles all in vaporous form. When this vaporous mixture enters the catalyst chamber 44 and comes into contact with the catalyst, any unreacted fatty acids and the amides are converted to nitriles. By means of the heating fluid the catalyst chamber is maintained at a suitable temperature for liquid phase reaction such as 600° F.

The temperature of the reaction zone at tower 40 should be above the boiling points of the nitriles under the pressure conditions employed, but should be below 700° F. and preferably below 600° F.

The nitrile vapors passing from chamber 44 are condensed by the nitrile condenser 51 and the moisture and excess ammonia pass off to the atmosphere. As in the first system described, suitable arrangement may be made for recovering the excess ammonia for re-use in the process.

Where amides are not desired as a by-product, the lower or stripping section of the tower serves no useful purpose and may be eliminated as mentioned in connection with the first described system.

This system illustrated in Figure 3 is not affected substantially by using a feed material which contains fatty acid radicals of a wide range of boiling points, and so may be preferred for some types of feed stock. For example, the modified system may be efficiently operated using the fatty acid mixtures obtained by the hydrolysis of any natural oil.

The foregoing detailed description has been given for purposes of explanation only and no unnecessary limitation should be understood therefrom, it being understood that many changes may be made in the manner of carrying out the invention, all within the spirit of the invention.

This application is a division of my application Serial No. 384,232, filed March 20, 1941, now abandoned, of which my co-pending application Serial No. 622,925, Patent No. 2,524,831, is also a division.

I claim:

1. A process for making fatty acid nitriles and amides, comprising reacting liquid fatty acid having at least eight carbon atoms with ammonia in a reaction zone, maintaining reaction temperatures for the forming of said amides and the conversion of a portion of the amides to nitriles, said temperatures being below the boiling point of the fatty acid and above the boiling point of the nitriles, passing nitriles upwardly in said zone and unconverted amides downwardly in said zone whereby said amides are segregated in a lower portion of said zone, withdrawing vaporized nitriles and condensing the same, and withdrawing amides separately from the lower portion of said zone.

2. A process for making fatty acid nitriles and amides, comprising reacting liquid fatty acid having at least eight carbon atoms with ammonia in a reaction zone, maintaining reaction temperatures for the forming of said amides and the conversion of a portion of the amides to nitriles, said temperatures being below the boiling point of the fatty acid and above the boiling point of the nitriles, passing nitriles upwardly in said zone and unconverted amides downwardly in said zone whereby said amides are segregated in a lower portion of said zone, and withdrawing amides from the segregated portion thereof in the lower portion of said zone.

3. In a process for preparing fatty acid amides, the steps of reacting fatty acids having at least eight carbon atoms with ammonia in a reaction zone to form amides, maintaining said zone at temperatures below the boiling point of the fatty acid and at reaction temperatures for said acid whereby amides and nitriles are produced in said reaction zone, pasisng nitriles upwardly through said zone, passing said amides downwardly in a series of zones containing mixtures having decreasing proportions of fatty acids and increasing proportions of amides toward the bottom of the series of zones, and withdrawing liquid amides from the lower portion of said series of zones.

4. In a process for continuously preparing fatty acid amides, the steps of maintaining a plurality of vertically-spaced pools containing fatty acid, nitriles, and amides, introducing into said pools fatty acid having at least eight carbon atoms, passing ammonia upwardly through said pools, maintaining reaction temperatures for the forming of amides and conversion of amides to nitriles, said temperatures being below the boiling point of the fatty acid and above the boiling point of the nitriles, passing nitriles upwardly through said pools and passing amides downwardly through said pools whereby the pools toward the bottom consist predominantly of amides, and withdrawing amides from one of said lower pools.

5. In a process for continuously preparing fatty acid nitriles, and amides, the steps of maintaining a plurality of vertically-spaced pools containing fatty acids, nitriles, and amides, introducing into said pools fatty acid having at least eight carbon atoms, passing ammonia upwardly through said pools, maintaining reaction temperatures for the forming of amides and conversion of amides to nitriles, said temperatures being above the boiling point of the nitriles and below 700° F., passing nitriles upwardly through said pools, withdrawing and condensing vaporized nitriles, passing amides downwardly through said pools whereby the pools toward the bottom consist predominantly of amides, and withdrawing liquid from a lower pool.

6. In a process for continuously preparing fatty acid nitriles and amides, the steps of maintaining a plurality of vertically-spaced pools containing fatty acids, nitriles, and amides, introducing into said pools fatty acid having at least eight carbon atoms, passing ammonia upwardly through said pools, maintaining reaction temperatures for the forming of amides and conversion of amides to nitriles, said temperatures being above the boiling point of the nitriles and below 600° F., passing nitriles upwardly through said pools, withdrawing and condensing vaporized nitriles, passing amides downwardly through said pools whereby the pools toward the bottom consist predominantly of amides, and withdrawing liquid from a lower pool.

7. In a process for continuously preparing fatty acid nitriles and amides and for separately recovering the nitriles and amides, the steps of maintaining a plurality of vertically-spaced pools containing fatty acids, nitriles, and amides, introducing into said pools fatty acids having at least 8 carbon atoms, passing ammonia upwardly through said pools, maintaining reaction temperatures for the forming of the amides and conversion of amides to nitriles, said temperatures being above the boiling point of the nitriles and below 600° F., passing nitriles upwardly through at least the upper pools in said vertically-spaced series of pools, passing unconverted amides downwardly through at least the lower pools of said series whereby amides are segregated in the lowermost of said pools, and drawing off a stream from the lowermost of said pools for the recovery of segregated amides.

RALPH H. POTTS.

REFERENCES CITED

The following references are of record in the file of this patent:

UNITED STATES PATENTS

| Number | Name | Date |
|---|---|---|
| 1,925,198 | Melville | Sept. 5, 1933 |
| 2,042,729 | Ralston et al. | June 2, 1936 |
| 2,061,314 | Ralston et al. | Nov. 17, 1936 |
| 2,224,984 | Potts et al. | Dec. 17, 1940 |
| 2,229,219 | Oxley et al. | Jan. 21, 1941 |
| 2,248,109 | Morrison et al. | July 8, 1941 |
| 2,314,894 | Potts et al. | Mar. 30, 1943 |